US005586219A

United States Patent [19]
Yufik

[11] Patent Number: 5,586,219
[45] Date of Patent: Dec. 17, 1996

[54] PROBABILISTIC RESOURCE ALLOCATION SYSTEM WITH SELF-ADAPTIVE CAPABILITY

[76] Inventor: Yan M. Yufik, 12204 St. James Rd., Potomac, Md. 20854

[21] Appl. No.: 312,961

[22] Filed: Sep. 30, 1994

[51] Int. Cl.$^6$ .......................... G06F 15/00; G06F 15/20; G06F 15/36
[52] U.S. Cl. ............................................ 395/20; 395/326
[58] Field of Search .......................... 395/20, 140, 600, 395/650, 20, 155; 364/401, 554, 402; 379/221

[56] References Cited

U.S. PATENT DOCUMENTS

| | | | |
|---|---|---|---|
| 4,525,830 | 6/1985 | Cohen et al. | 370/60 |
| 4,748,658 | 5/1988 | Gopal et al. | 379/221 |
| 4,797,839 | 1/1989 | Powell | 364/554 |
| 5,040,134 | 7/1991 | Park | 395/27 |
| 5,043,876 | 7/1991 | Terry | 395/600 |
| 5,046,019 | 9/1991 | Basehore | 395/3 |
| 5,050,095 | 9/1991 | Samad | 395/23 |
| 5,050,096 | 9/1991 | Seidman | 395/22 |
| 5,148,365 | 9/1992 | Dembo | 364/402 |
| 5,222,195 | 9/1993 | Alkon et al. | 395/24 |
| 5,276,771 | 1/1994 | Manukian et al. | 395/11 |
| 5,276,772 | 1/1994 | Wang et al. | 395/27 |
| 5,325,525 | 6/1994 | Shan et al. | 395/650 |
| 5,343,388 | 8/1994 | Wedelin | 364/402 |
| 5,369,570 | 11/1994 | Parad | 364/401 |
| 5,402,478 | 3/1995 | Hluchyj et al. | 379/221 |
| 5,440,675 | 8/1995 | Matsunaga et al. | 395/140 |
| 5,446,891 | 8/1995 | Kaplan et al. | 395/600 |

OTHER PUBLICATIONS

Yufik et al, "Design for Trainability . . . " *Designing and Using Human–Computer Interfaces on Knowledge Based Systems*, 1989, 160–167.

Yufik et al, "Human–Computer", *HCI International '93*, vol. 1, Aug. 1993, 642–610.

Yufik et al, "Knowledge Measurement", *Cybernetics and Applied Systems*, 1992, pp. 188–238.

Kernighan, "Optimal Sequential . . . " *Journal of the Association for Computing Machinery*, vol. 18, No. 1, Jan. 1971, pp. 34–40.

Hu et al, "Shortcut in the . . . " *IBM Jour. of Res. Dev.*, Jul. 1969, 387–390.

Yufik et al "A Technique . . . " Report for NASA Contract No. NAS2–13283, 1991.

Jaffe, "Algorithms for Finding . . . " *Networks* vol. 14 (1984), pp. 95–116.

Barto et al, "Associative Search . . . " *Biological Cybernetics* 40, 201–211.

Lawler, "Cutsets and Partitions . . . " *Networks* vol. 3, pp. 275–285.

*Networks and Algorithms*, Dolan et al, 1993, pp. 102–117.

Blackwell et al, "A New Approach . . . " *Pattern Recognition*, vol. 25, No. 6, pp. 655–666, 1992.

*Primary Examiner*—Robert W. Downs
*Assistant Examiner*—Sanjiv Shah
*Attorney, Agent, or Firm*—Michael de Angeli

[57] ABSTRACT

A probabilistic resource allocation system is disclosed containing a low capacity computational module (Short Term Memory or STM) and a self-organizing associative network (Long Term Memory or LTM) where nodes represent elementary resources, terminal end nodes represent goals, and directed links represent the order of resource association in different allocation episodes. Goals and their priorities are indicated by the user, and allocation decisions are made in the STM, while candidate associations of resources are supplied by the LTM based on the association strength (reliability). Reliability values are automatically assigned to the network links based on the frequency and relative success of exercising those links in the previous allocation decisions. Accumulation of allocation history in the form of an associative network in the LTM reduces computational demands on subsequent allocations. For this purpose, the network automatically partitions itself into strongly associated high reliability packets, allowing fast approximate computation and display of allocation solutions satisfying the overall reliability and other user-imposed constraints. System performance improves in time due to modification of network parameters and partitioning criteria based on the performance feedback.

21 Claims, 2 Drawing Sheets

| | | | | | | | | | | |
|---|---|---|---|---|---|---|---|---|---|---|
| $R_n$ | $\mu_n G_1$ | | | | | | | | | |
| | – | | | | | | | | | |
| | – | – | | | | | | | | |
| | – | – | – | | | | | | | |
| | – | – | – | – | | | | | | |
| $R_4$ | $\mu_4 G_1$ | $\mu_5 G_2$ | – | – | – | | | | | |
| $R_3$ | $\mu_3 G_1$ | $\mu_4 G_2$ | – | – | – | – | | | | |
| $R_2$ | $\mu_2 G_1$ | $\mu_3 G_2$ | $\mu_4 G_3$ | $\mu_5 G_4$ | $\mu_6 G_5$ | – | – | – | $\mu_1 G_n$ | $\sum_{ij} \mu_{i+1} G_j$ |
| $R_1$ | $\mu_1 G_1$ | $\mu_2 G_2$ | $\mu_3 G_3$ | $\mu_4 G_4$ | $\mu_5 G_5$ | – | – | – | $\mu_N G_n$ | $\sum_{ij} \mu_i G_j$ |
| | $G_1$ | $G_2$ | $G_3$ | $G_4$ | $G_5$ | – | – | – | $G_n$ | |

PROBABILISTIC RESOURCE ALLOCATION SYSTEM WITH SELF-ADAPTIVE CAPABILITY

This invention was made with Government support under contract NAS213700 awarded by NASA. The Government has certain rights in this invention.

FIELD OF THE INVENTION

This invention relates generally to systems for solving resource allocation problems, wherein the ability of the system to provide optimal solutions to problems of a given class improves over time through simplification of the decision-making process. More particularly, the invention relates to methods and systems for solving a wide class of resource allocation problems, wherein common elements of prior solutions are employed to simplify computation of successive solutions.

BACKGROUND OF THE INVENTION

For many years, workers have sought improvement in the automated solution of resource allocation problems. "Resource allocation problems", as used in this application, encompasses many different classes of problems. For example, a classical resource allocation problem is the so-called "traveling salesman" problem, wherein the question is to find the most efficient route to be taken by a traveling salesman through a series of stops, for example, all 48 state capitals of the continental United States. Additional constraints may include that no capital can be visited more than once, that the trip is to be accomplished using minimum total mileage, or the like. One way of solving this problem would be to compute all possible paths and simply to determine which had the least total mileage. However, as will be appreciated by those of skill in the art, there are so many possible paths that this problem is computationally very costly to solve using this "brute force" approach. Accordingly, the art has sought ways to simplify such problems.

Another class of resource allocation problems relates to the targeting of specified resources, such as weapons, towards specified goals, such as targets to be destroyed. The problem takes on additional complexities when it is realized that the likelihood of success of each weapon with respect to a particular target must be taken into account. Further, while the most reliable weapon may initially be targeted to the most important target, thus requiring evaluation of the relative importance of the targets in addition to reliability of the weapons, consideration of further constraints may also be necessary. For example, it may transpire that one of the targets cannot be successfully attacked other than with a single most effective weapon, meaning that another target, possibly the most important, must be attacked with less effective weapons if the overall solution is to be of value. As individual targets are hit, the relative priorities of the targets may change, depending on actual success ratios. A suitable mechanism for solving such a problem must also take into account multiple targeting of various weapons on the same targets to ensure their destruction, and other similar constraints. Defensive considerations must also be accounted for. Again, the "brute-force" approach of trying all possible solutions in order to select the most efficient is prohibitively costly in terms of the computation time and resources necessary.

The prior art has proposed solution of such complex problems using so-called "neural network" techniques. Neural networks may be considered to be sets of nodes connected by links, and may be realizable either physically or in computer software. Decisions are made based on plural weighted inputs to each node. The advantage of neural networks is generally considered to be that they "learn" in the sense that in a series of trials they can improve their performance, gradually approaching the optimal solution of a given problem. Numerous references describe neural networks both theoretically and their application to various practical problems, and additional references provide further improvements thereon. See generally U.S. Pat. Nos. 5,276,772 to Wang et al, 5,050,095 to Samad, 5,040,134 to Park, 5,222,195 to Alkon et al, and 5,276,771 to Manukian et al.

However, so far as known to the present inventor, no neural network solution is entirely satisfactory for solution of resource allocation problems as generally above, particularly in that the performance of neural networks degrades steeply when the constraints of a particular problem deviate from those initially learned by the network. Generally, performance gains obtained by a neural network's learning a solution to one problem do not carry over to another problem, requiring the network to be completely retrained. As resource allocation problems of a given class vary widely due to changes in the set of available resources, modification of allocation priorities, and other constraints, neural networks are not satisfactory for efficient solution of resource allocation problems.

SUMMARY OF THE INVENTION

The present invention addresses these deficiencies of the prior art by providing a self-adaptive system for solving resource allocation and similar problems. According to the invention, prior solutions to similar problems are stored and used in partial solution of later problems. Where a particular set of allocation decisions is made in a successful solution to a problem, and the same allocations are useful in solution of a subsequent problem, that fact is automatically stored. That subset of allocations can then be replaced by a single more simplified representation of the group of allocations in subsequent solutions of problems from the same class of problems, saving on the computation time required to perform the entire solution.

Taking a very simple example, suppose that in the traveling salesman problem described above, the salesman must visit all of the 48 capitals of the contiguous United States while traveling the least total number of miles. As indicated above, it is computationally inefficient to carry out all possible solutions to determine the minimal amount of mileage required. However, in carrying out a number of solutions it may be apparent that in each case the salesman visits Annapolis, Md., Wilmington, Del., and Trenton, N.J., in sequence simply because these capitals are so close to one another. If the United States is represented as a network, wherein the capitals are represented by the nodes and highways are represented by links connecting the nodes, according to the invention, three nodes, representing the three capitals, are replaced by a single "supernode" in calculation of the complete solution. Simply reducing the number of possible nodes which must be visited in sequence from 48 to 46 in this way substantially reduces the computation time. Similarly, other groups of capitals may always be visited in sequence, further simplifying the calculations. For example, Concord, N.H., Boston, Mass., and Augusta, Me. would also typically form a single supernode, further simplifying the computation. When the solution is determined, the supernodes are replaced by their constituent nodes and links, thus "reconstructing" the network.

In this example, the nodes represent actual points in space, and the links between them the actual distances therebetween. In other problems, the nodes may be physical objects, such as weapons having finite probabilities of success, and the links their allocation to targets; or the nodes may be intangibles, such as funds, and the links sequences connecting events in time; or the nodes may be personnel, and the links the time required to carry out needed work. In each case, a network provides a useful way to model the choices presented between the various options available.

While the example given above of the traveling salesman problem may seem trivial, in fact the conventional wisdom in computer programming generally is to analyze all possible solutions, that is, to rely on the "brute-force" power of the computer to carry out massive computations in order to determine optimum solutions to complex problems in resource allocation. Even with modern "parallel processing" computers, which divide the computational load between plural processors to solve massive problems, the computation time required to solve such complex problems is excessive.

According to an important aspect of the invention, repetitive computations common to given classes of problems are automatically recognized. A partial solution, typically derived in solution of one or more prior problems, is automatically and optimally substituted for the repetitive computations in arriving at an optimum solution to each subsequent resource allocation problem. This process may be referred to as "decomposition" of the network connecting the resources available to the goals to be satisfied. When the optimum solution has been determined, the complete network is reconstructed, providing a complete solution to the problem.

Examples of the use of the invention in reconfiguration of a node system include power routing in the case of partial grid failure in a power distribution system, information rerouting in a communication network connected by communications processors at physically spaced nodes, or rerouting of goods and the like in a complex transportation system to compensate for temporary road blockages and the like. In these systems, the nodular structure of the network connecting the resources to be allocated to the goals to be satisfied is apparent. However, as indicated above, the system of the invention has applicability to resource allocation problems beyond such clearly nodular structures.

Allocation of weapons to targets to be destroyed is a common resource allocation problem, often involving the assignment of literally thousands of weapons to hundreds of targets. An optimum solution, or even a near-optimum solution to a particular problem, cannot be found other than by extensive modeling. Nonetheless, as indicated above in the case of the traveling salesman problem, certain partial solutions do appear repetitively, e.g., in repeated simulations involving likely sets of resources available and targets to be hit. In subsequent calculations, those partial solutions known to be effective can be substituted for the corresponding portion of the complete network, greatly shortening the computation time required.

In this example, the nodes are physical objects, such as weapons and targets. There are two types of links: links between weapons and targets, representing allocation of weapons to different targets weighted by finite probabilities of success, and links between the weapons themselves, weighted by the relative frequency of joint allocation of those weapons to targets in a series of weapon allocation problems. In the latter case, the strength or "reliability" of "resource-to-resource" links connecting weapons represent the frequency of allocation of that combination of weapons to a target. Automatic recognition of such effective joint allocations, and using this recognition to simplify the actual allocation process, is at the heart of the present invention.

Specifically, after a sufficient number of resource allocation problems have been solved, common resource-to-resource connections form a network having links of varying strength depending on how often those connections have been exercised, that is, how often each combination of weapons has been jointly used throughout the history of previous allocations. The network is then self-partitioned into cohesive clusters, or "packets", each including those weapons that, according to the accumulated experience, can usefully be allocated jointly against their targets. The packets are then replaced with "supernodes" in actual resource allocation. As a result, the original problem of making allocation decisions with respect to each weapon individually is dynamically reduced to a much smaller problem of allocating a few groups of weapons.

Variation in the problem conditions, for example, addition of new weapons, change of target priorities, and the like entails addition of new nodes to the network, and/or change of connection weights. The network is then automatically and optimally repartitioned and new packets of nodes are formed to accommodate the new circumstances. Preferably, the partitioning algorithm balances the significance of new circumstances (that is, the weights of the new connections) against the already existing network properties, so that the newly computed groups incorporate the old ones in an optimal fashion. In this way the system builds continuously on its previous experiences, accommodating changes of conditions without limit and without performance degradation.

Recognition of repeated sequences of user activities can also be used according to the invention to simplify processing. For example, the teachings of the invention can be used in designing man-machine interfaces, e.g., the complex control panels required for control of aircraft, nuclear plants, chemical plants, and the like. Information indicating the items of data the user repetitively accesses and control actions taken in response to various repetitive sequences of events can be collected in prototyping the control panel, and used to simplify the user interface accordingly, for example, to conveniently provide the user those pieces of information and control options he has commonly requested previously in similar control situations.

In a further example, presently available computer programs such as word processing programs or the like typically provide an initial user screen including a menu prompting the user to select a control option from a menu, e.g., "File", "Print", "Edit", "View", "Help", and the like. This initial menu, and a number of sub-menus, are organized in a "tree", such that when the user selects a control option from one menu, a corresponding sub-menu appears, giving the user a new selection of options. These menus, and the sequence in which the various choices appears are selected by the system designer in accordance with his understanding of how the typical user will want to operate the system, i.e., in accordance with the system designer's best guess of likely operational sequences, so as to maximize convenience to the user.

In many circumstances, however, the user may have a different idea of how the computer program should be organized; that is, the user's idea of the appropriate items to appear on each menu may differ from the system designer's, in which case the user will commonly spend much time looking for various control options. Of course, the user can consult the manual and find the option he is looking for; however, it will be apparent that most users do not care to do so, and certainly do not care to do so more than once. Accordingly, it would be desirable if the program itself would monitor the sequence in which the user accessed various control options, and would adapt itself, and specifically its sequence of menus, so that the control options previously sought by the user would be subsequently presented by menus so as to allow the same sequence used previously to be conveniently followed. Accordingly, this also is within the scope of the invention.

In one embodiment of a system according to the invention, it may be configured as a long-term memory having self-organizing associative capabilities, effectively connecting nodes by links, a short-term memory where on-line resource allocation decisions are made based on the resource associations established off-line in the long-term memory, and a supervisory and interaction management module providing operator interaction and control functions.

The short-term memory performs the actual allocations, based on the network output, and can provide near optimal allocation, e.g., by applying the solution of the most similarly prior problem to a new problem. The long-term memory carries out the detailed computations required to identify packets and carry out decomposition of the network. Over time, as the long-term memory becomes more and more efficient due to simplification of the decision tree by recalling previously successful partial solutions, the capability of the short-term memory grows concomitantly greater.

BRIEF DESCRIPTION OF THE DRAWINGS

The invention will be better understood if reference is made to the accompanying drawings, in which.

DESCRIPTION OF THE PREFERRED EMBODIMENTS

The assignment of a finite group of weapons having differing probabilities of success with respect to various types of targets—for example, one type of missile may have a 90% success rate on stationary targets, but only a 50% success rate on airborne targets, another may have a success rate diminishing more rapidly with distance from the target than other types, and so on—is treated herein as an exemplary research allocation problem. Typically, in the prior art, the most efficient allocation of such resources to their goals has been performed using a "brute force" approach wherein all possible combinations of weapons to targets are tested, and the most efficient is selected. This evaluation normally requires calculation of the "gain" anticipated by assignment of each particular resource to a corresponding goal, by multiplication of the probability of success of that resource with respect to that goal, the goal being weighted in some meaningful way.

For example, in a military situation, one will normally have weapons of a variety of striking forces and efficiencies, and a group of targets of greater or lesser significance. Destruction of the enemy's offensive weapons may be valued more highly than destroying his supply depots, for example. Moreover, the success rate of a typical weapon will vary substantially depending on the target to which it is assigned; thus, while the value of destroying an entire aircraft carrier may be very great, the difficulty of doing so with a substantial probability of success may necessitate using even one's most effective weapons elsewhere. Accordingly, in order to calculate the most favorable assignment of weapons to targets, each of the various combinations thereof must be evaluated and the net gain of each of the possible solutions compared to all the other possible solutions.

Figures 1, 2:
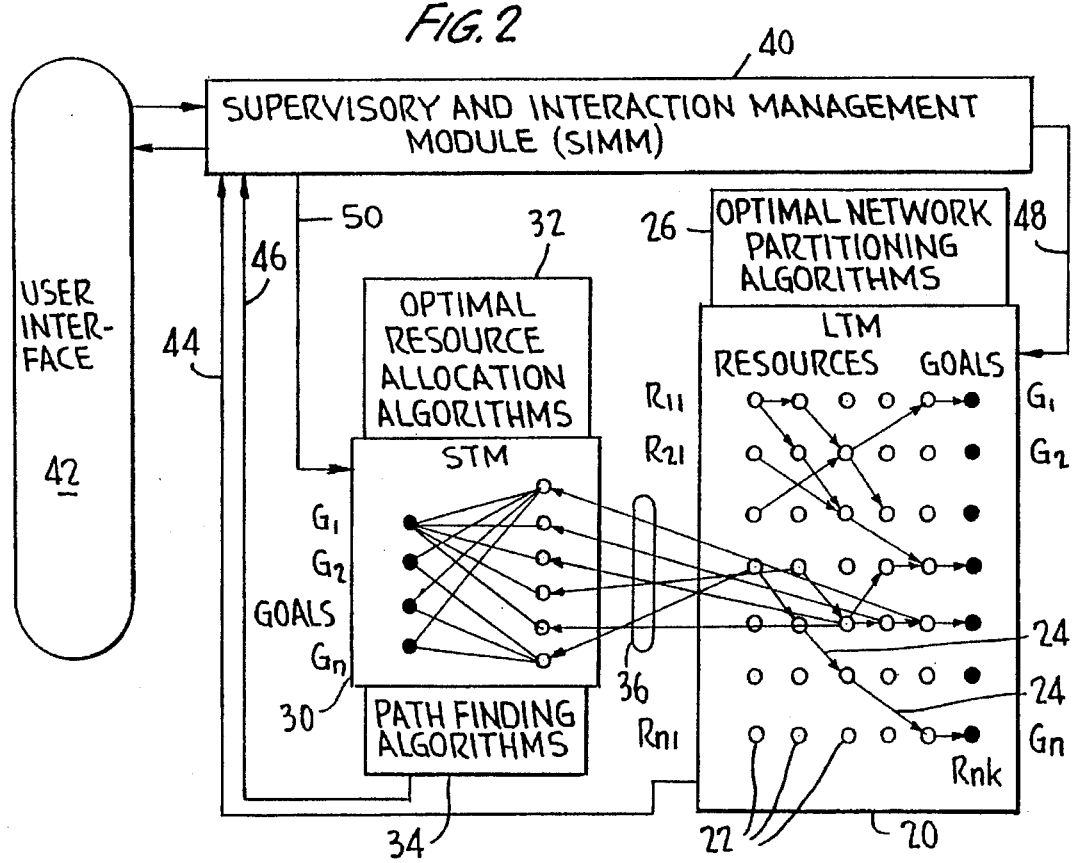
FIG. 1 shows a two-dimensional matrix of the type commonly used in the prior art to evaluate the net gain of a particular set of resource allocations, as a step in an overall resource allocation computation.
FIG. 2 shows a schematic outline view of a self-adaptive resource allocation system according to one embodiment of the invention.

FIG. 1 shows in highly schematic form a matrix exemplifying a small fraction of the calculations needed in a very simple situation. In FIG. 1, resources $R_1, R_2, \ldots R_n$ are ranked vertically upwardly along the vertical axis of the matrix, while goals $G_1, G_2, \ldots G_n$ are similarly aligned along the lower edge of the diagram. In a first assignment scenario, each of the resources $R_1, R_2, \ldots R_n$ is assigned to the correspondingly numbered goal. The gain for each assignment is the probability $\mu_i$ of each resource meeting the particular goal multiplied by the significance of the goal $G_j$. Thus, the results of these calculations for a first assignment of resources to goals is the sum of the gains in each row of the matrix; for the lowermost row, the sum is:

$$\mu_1 G_1 + \mu_2 G_2 \ldots \mu_n G_n = \sum_{ij} \mu_i G_j$$

In the next upward column, each of the resources is moved one space to the left, in effect, and multiplied by the same goal, so that here the sum is:

$$\mu_2 G_1 + \mu_3 G_2 \ldots \mu_1 G_n = \sum_{ij} \mu_{i+1} G_j$$

This is repeated until each of the resources has been applied against each of the goals; when there are ten each of goals and resources, this requires a hundred individual gain computations and ten sums to be evaluated.

It will be immediately apparent, however, that this is only one of a larger number of possibilities, that is, this calculation assumes that the order of the resources as applied to the goals is invariant. Actually, of course, there may be better solutions available if the order of the resources is altered in addition to altering their sequence of application to the goals. A very large number of additional computations will be required in such a "brute force" calculation to take into account each of the possible assignments.

One possible simplification of the calculation can be accomplished by selecting the single gain term having the highest maximum value from the 10×10 matrix of FIG. 1, thus arbitrarily determining that this particular assignment is part of the optimum solution being sought. (This would normally only be done if there are no nonzero values in that particular row, corresponding to goals that simply cannot be met without assignment of a unique resource thereto.) If such a single term is selected, a subsequent 9×9 matrix can be constructed, comparable to that shown in FIG. 1, to determine the next maximal gain term. The process can then be repeated by selecting the maximum value from that matrix, recalculating an 8×8 matrix, now having two assignments fixed, and so on. This results in some savings in computational time with respect to the "brute force" solution. However, the optimal solution is realized only if the assumption that the maximum terms selected are part of the optimal solution is correct.

A more general method for computing a near-optimal allocation of resource requires that each element of the matrix in FIG. 1 is computed as the potential gain yielded by allocating that resource to the corresponding goal minus the sum of potential losses caused by unavailability of this resource for allocation to all other remaining goals. After the largest element in the matrix is selected, thus allocating one resource to one goal, the entire matrix is recomputed for the still unallocated set of resources, and the process repeated, until the resource set is exhausted.

The problem of assigning weapons to targets as above is but one of a vast variety of resource allocation problems that have been historically analyzed as above, namely, by trying all possible solutions and only simplifying the overall matrix when candidates emerge through extensive computation. Such problems are widespread throughout government and industry and a more efficient method of solution would be of great value. For example, there are thousands of organizations in the United States alone where, every day, managers decide the most efficient sequence for delivery trucks on routes that vary only slightly day to day due to various customer needs and the like. Similarly, the military commonly must assign literally hundreds of weapons, aircraft, missiles and the like to dozens of targets, if only for training purposes. Likewise, the power industry must make decisions continually on how to control flow of power through the power grid, transportation companies must assign loads to trains or long-haul trucks and select the best routes, communications networks are continually reconfigured to deal with various loading patterns, and the like.

Each of the above listed problems is generally repetitive, in the sense that although the specific resources available and goals to be satisfied will vary somewhat from day to day, the problem is similar in overall scheme and complexity from day to day. Therefore, rather than completely analyze each day's problem from ground zero, so to speak, it would be more appropriate and more conservative of computational time and effort to employ applicable portions of prior solutions that had yielded good results, reducing the additional computation time to that required to solve the differences between each new version of a consistent class of problems and prior similar problems of the same class.

The present invention provides a system and method for applying the resources and goals defining a particular problem to be solved to a computational device storing the results of similar problems previously solved successfully, automatically identifying common elements of the problem, and using the prior knowledge to simplify computation of the solution to the particular problem. In one embodiment, the current problem is stored in short-term memory, providing near-optimal resource allocation, associated with a long-term memory for calculating the solution of a particular problem employing the previous solutions where applicable, to reduce the computation time required.

It is of interest that this partition of functions is not unlike that provided by the human brain. If, for example, one plans a trip to a city not previously visited, nearly every aspect of the trip is new and must be planned for carefully; the entire trip must be considered at length in short-term memory, as long-term memory provides little use in solving the particular problem. By comparison, if one is making a trip to a city already visited, one will be aware of the typical weather conditions, and will know, for example, how to get from the airport to one's hotel; in this case, one's long-term memory will provide most of the solutions to individual problems necessary for planning the trip, and short-term memory is needed only to focus on the new aspects of the trip, i.e., to recall where various meetings are scheduled, what materials will be needed, and the like.

Applying this analogy to more traditional research allocation problems, a Federal Express manager in a particular locality may know, for example, that on any given day he will have between 500 and 2000 packages to deliver to between 40 and 100 office addresses and will have between 6 and 12 drivers available to do so. If, on any given day, the package load and addressing requirements are similar to those of previous days, he can simply assign his drivers routes driven on previous days with similar loadings. On the other hand, if he has a particularly elaborate or sensitive shipment to a particular location, he may take all shipments to that location out of their normal routine and assign one driver to that particular location only. Again, where possible, he will rely on previous solutions known to be useful in solving particular problems, that is, on information stored in long-term memory, such that short-term memory is required to address only the departures of the new problem from the prior problem.

Similarly, in the battlefield environment, one goal of war-gaming is to train commanding officers to recognize patterns of weapons availability and target allocation that correspond to successfully solved problems and to adapt those solutions to address satisfactorily any new factors, such as unexpected losses or gains, and the like; in this way, the entire resource allocation process is performed efficiently, effectively relying on the benefit of prior knowledge.

FIG. 2 shows one possible arrangement of computer resources or the equivalent for similarly partitioning the information and computation necessary to efficiently solve a particular example of a class of resource allocation problems according to the invention. FIG. 2 depicts this system as specific hardware components supplied with appropriate operating software. It will be appreciated by those of skill in the art that this depiction is essentially schematic, and that a general purpose computer, for example, could be programmed to carry out the functions, and specifically the partition of functions described in connection with FIG. 2, without the explicit requirement of separate hardware elements. The description herein of this embodiment of the invention should be considered as exemplary only of the invention and not as a limitation thereon.

Referring now more specifically to FIG. 2, the system comprises a long-term memory unit (LTM) 20 configured as a number of nodes 22 connected by links 24, forming a network representing the solution to the problem. Goals $G_1$, $G_2 \ldots G_n$ represent the end nodes in the network, while resources $R_{11}, R_{21}, \ldots R_{n1}, R_{11}, R_{12} \ldots R_{nk}$ represent the starting nodes and the intermediate nodes. Thus, this arrangement allows explicitly for the possibility that resources are assigned at a plurality of intermediate nodes to solution of a particular problem; that is, the solution of a particular problem involves the connection of each of the goals $G_1, G_2, \ldots G_n$ to starting and intermediate resources $R_{11}, R_{21}, \ldots R_{12}, \ldots R_{nk}$. The "solution" thus essentially involves the selection of links making connections between the nodes such that all the resources required to reach each particular goal are assigned thereto.

As indicated at 26, the long-term memory unit 22 operates under the control of optimal network partitioning algorithms which are described in detail below. Essentially, these algorithms identify packets of reliably-connected nodes. This identification can be performed by monitoring the frequency of use of the links. A candidate packet may be replaced by a "supernode" when the sum of the weights exceeds the sum of the weights of the links making up the packet's "cutset", that is, a group of links separating the packet from the remainder of the network.

Equivalently, the packets may be identified responsive to the determination that the average weights of the individual links in the packet are greater than the average weights of links in the corresponding cutset. In both cases, the packets identify groups of strongly connected, that is, repeatedly co-allocated, resources.

Resource allocation algorithms employed in the short-term memory solve a matrix equation designed to maximize the net gain of the solution, in addition to other functions provided according to the invention. As generally discussed above, the net gain of each possible solution is the sum of the individual gains determined by multiplication of the probability of success of each of the resources by the value of the corresponding goals. In various cases, additional terms for reallocation of the priorities of goals as other goals are met can be included, varying transactional costs may be associated with each of the intermediate nodes, these representing, for example, attrition, cost of replacement supplies and the like, and other features can be incorporated in order to model realistically the total cost of the satisfaction of the goals $G_1, G_2, \ldots G_n$ by allocation of specific resources $R_{11}, \ldots R_{nk}$ thereto.

As indicated, according to the invention, an important capability of the long-term memory is "self-partitioning", that is, over time, packets of nodes and links that are objectively determined to be efficient in solution of a particular class of resource allocation problems are replaced by simpler versions thereof. More specifically, over time, as particular examples of problems from a class of problems are solved, groups of resources will be assigned repetitively to satisfaction of goals or groups of goals. Where this is recognized, the number of computations required to calculate the maximal-gain solution of any particular problem can be simplified by replacing those groups of nodes and links by a simplified model thereof. This "decomposition" of the network is explained in further detail below in connection with FIG. 3.

FIG. 2 also depicts the short-term memory unit (STM) 30 which, as its name implies, stores information regarding the goals and resources assigned to a particular problem, and solves this problem using additional guidance of the LTM in the form of a simplified network. If such simplification is significant due to highly repetitive allocation solutions in the past resulting in the reduction of the network to a comparatively small number of nodes, the STM applies path-finding algorithms to allocate groups of resources to the current goals. If, due to solution diversity in the past, the LTM network still remains of a relatively large size, the STM applies the basic matrix computation method but uses LTM guidance to reduce the matrix in comparison with its original size.

More generally, short-term memory unit 30 has as input nodes the specific goals to be met $G_1, G_2, \ldots G_n$, and is operated under the control of optimal resource allocation algorithms indicated at 32 and path finding algorithms 34 for providing initial solution possibilities to the long-term memory, as indicated by the interconnecting links shown collectively at 36. For example, the short-term memory 30 may be capable of evaluating the differences between a newly presented problem, as defined by an exact set of resources to be applied to an exact set of goals, and the set of problems previously solved, in order to assist the long-term memory 20 in selecting the closest-fitting successful prior solution as a starting point for the calculation of the resource allocation matrix for the new problem.

A further significant component of the FIG. 2 embodiment of the invention is the supervisory and interaction management module (SIMM) 40. The function of this unit is to provide a user interface as indicated at 42, that is, to accept specifics of the resources and goals from the user, as well as any updated information as to their availability which might affect the likelihood of success of each particular resource, updated specifications concerning the relative importance of the goals, including the reordering thereof as goals are met, and other information specific to the particular problem being addressed. Further, where the solution of the resource allocation algorithm (discussed in detail below) may reveal that alternative solutions appear to be possible, the user may be prompted to make a selection therebetween based on factors not explicitly entered into the problem. To this end, the supervisory and interaction management module 40 receives input from the LTM as indicated at 44 and the STM as indicated at 46, as well as providing inputs thereto at 48 and 50, respectively.

FIGS. 3(a)–(f) show stages in assignment of links 24 between nodes 22 connecting resources to goals in solution of a particular problem, and also illustrate how subgroups of links and nodes may be simplified as information over time is stored respecting a particular class of problems. In FIGS. 3(a)–3(f), directed connections, e.g., links 52, 54, correspond to allocation decisions. Solution of each allocation problem produces a series of paths, each path comprising resources allocated to the goal indicated as the terminal point at the end of each path. In solving a series of similar problems, these links gradually develop into a network. Since the paths partially overlap, individual links acquire different weights (strength). Network self-partitioning according to the invention identifies packets (shown by shaded ovals in FIG. 3(e)) where the strength of the links internal to the packets exceeds the strength of the external links, indicating that resources in the packets have commonly been used together. In subsequent allocation operations (FIG. 3(f)), the packets are represented by single supernodes, such that the resources within the packets need not be considered individually. The transition illustrated by the series of FIGS. 3(a)–3(f) illustrates problem simplification achieved as a result of this invention.

Figure 3A:
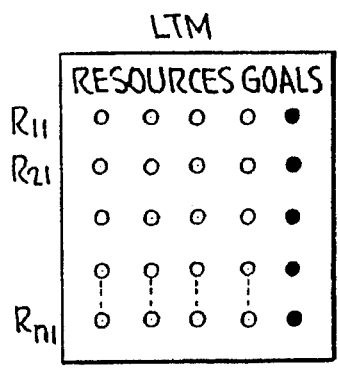
FIGS. 3(a)–3(f) shows stages in the self-adaptive reconfiguration of the long-term memory of the FIG. 2 system as problems of a particular class are successively solved.
Figure 3B:
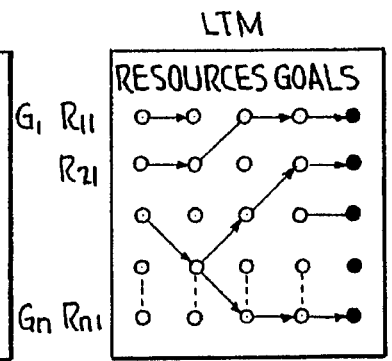
Figure 3C:
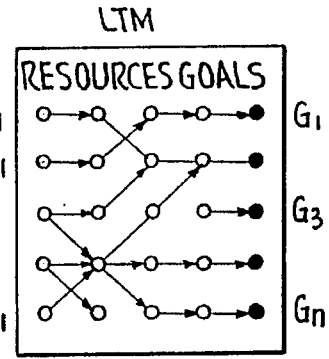
Figure 3D:
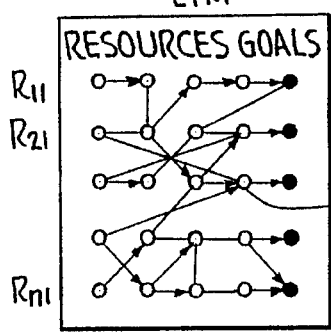
Figure 3E:
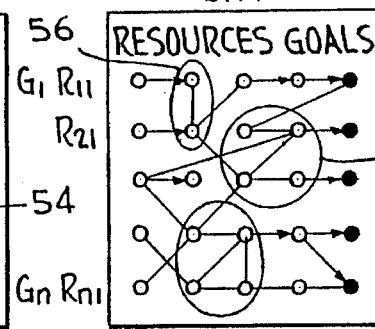

More specifically, FIG. 3(a) shows the LTM essentially as in FIG. 2, no links having been assigned between the nodes representing the resources $R_{11}, R_{22}, \ldots R_{n1}$, and the goals $G_1, \ldots G_n$. In FIG. 3(b), links have been established connecting some of the resources to some of the goals by solution of one of the typical resource allocation equations, described below. In FIG. 3(c), this process has been continued. Note in particular that in FIG. 3(b) goal $G_3$ is connected to one of the initial resources $R_{11}, R_{12}, \ldots R_{n1}$ by a complete path, while in FIG. 3(c) $G_3$ is no longer fully connected; this reflects replacement of the partial allocation represented by FIG. 3(b) with an updated solution during continued processing. This process is completed as shown in FIG. 3(d), where each of the goals $G_1, \ldots G_n$ has been connected to one of the input resources $R_{11}, \ldots R_{n1}$. FIG. 3(d) thus represents a complete solution to the problem. In FIG. 3(e) tentative allocations of nodes to highly reliable "packets" 56 have been made, reflecting highly reliable connections that are anticipated to be used in further similar problems. The identification of nodes making up packets 56 is discussed in detail below. Finally, in FIG. 3(f), packets 56 have been replaced by simplified "supernodes" 58 connected by links to each of the nodes to which the packets 56 had been connected. According to this important aspect of the invention, the "supernodes" 58 replace the packets 56, simplifying the overall structure of the resource allocation matrix illustrated by long-term memory 20, as can be readily appreciated by comparison of FIG. 3(f) with FIG. 3(d).

Figure 3F:
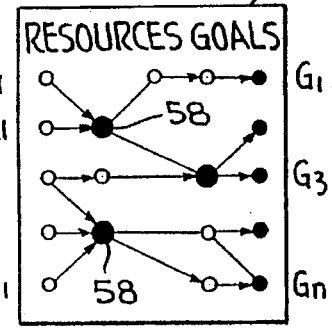

In subsequent solution of similar problems, the nodes represented by packets 56 in FIG. 3(e) are replaced by the supernodes 58 of FIG. 3(f), thus substantially simplifying the computation of the connection of all the resources $R_{11}, \ldots R_{n1}$ to the goals $G_1, \ldots G_n$. When the solution is subsequently completed, the supernodes 58 are replaced with the corresponding packets 56 in actual assignment of resources and sequences of connection therebetween as represented by the links connecting the nodes.

The process of replacing commonly used nodes making up packets 56 with supernodes 58 according to the invention is referred to as "decomposition" of the matrix, and the process of replacing the supernodes 58 with the corresponding packets 56 in presenting the complete solution to the problem is referred to as "reconstituting" the matrix.

Figure 4:
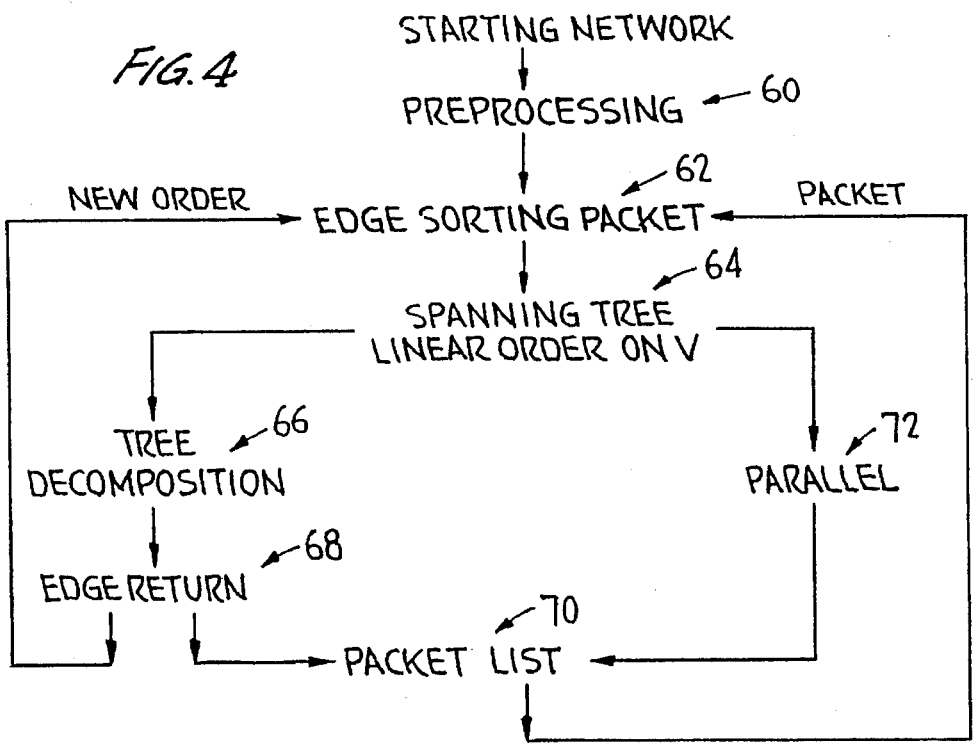
FIG. 4 shows the general outline of a network partitioning algorithm used in one embodiment of the invention in block diagram form.

FIG. 4 (discussed in detail below) shows a flow chart depicting the general scheme of network partitioning, that is, deriving the identification of packets 56. Summarizing this process, in essence, candidate packet assignments are first made. The frequency of use of the links connecting the nodes of the candidate packet to one another is compared to that of the links connecting the nodes of the candidate packet to the remainder of the nodes of the matrix represented by the LTM 20. The result of this comparison is to identify resources (represented by nodes) that are commonly employed collectively in solution of a class of problems, as indicated by the weights of the links connecting the nodes. Thus, if a particular group of links connecting two or more nodes of a candidate packet are used more commonly than the links connecting the candidate packet to outside nodes, the links and nodes comprising the packet can be replaced by a supernode and a smaller number of connecting links. The degree to which the usage of the links making up the candidate packets exceeds the usage of the outside links is a measure of the degree of utility or "reliability" of the packet; where relatively weakly-identified candidate packets reoccur in solution of successive problems, these can later be replaced with supernodes.

The long-term memory can be configured as an actual network of individual processors connected by communication links, the assignment of the links being implemented by switches, or as a software program, where the nodes are implemented as calls to a software subroutine calculating the gain available in a particular point in the resource allocation process, or in other ways apparent to those of skill in the art. Essentially the LTM represents a structured approach to performing many gain calculations; as such, the nodes can be implemented as calls to a gain-calculating subroutine and the links as communication of results to other similar subroutine calls. Alternatively, each node may be an individually-programmed processor, communicating with others as indicated by the links. It will be appreciated that the invention is not to be limited to the description herein of one implementation.

Those of skill in the art will recognize further that the node-and-link structure of the long-term memory 20 as discussed in connection with FIGS. 2 and 3 is in reality a simplified graphical representation of the kind of computational processing discussed above in connection with FIG. 1. As noted, FIG. 1 showed one set of possible allocation of resources to goals, and illustrated the calculation of the net gain of each of that set of possible allocations. Specifically, in an example of FIG. 1, ten possibilities of assigning ten resources to ten goals may be evaluated. The discussion of FIG. 1 emphasized that these were only ten of a much larger number of ways in which those ten resources could be assigned to those ten goals, and that all other possibilities would have to be evaluated separately to determine that which yielded the maximum gain. Connection of the individual nodes of the long-term memory 20 by links corresponds, in effect, to one possible solution, that is, one possible application of resources to goals; the optimal assignment of the resources to the goals as determined by the final network arrangement is equivalent to trying all possible allocations and selecting that yielding the maximum gain. The simplified nodal structure, e.g., as shown in FIG. 3(f), wherein the supernodes replaced packets of nodes known to be reliable in solution of a class of problems according to the invention, is approximated in the matrix representation of FIG. 1, by selection of one portion of a given solution, which then simplifies the computation required to perform the remaining allocations necessary to satisfy all goals. In either event, according to this aspect of the invention, the calculation process is simplified with respect to each successive example of a class of problems, by drawing on partial solutions determined in successful prior solutions of other problems of the same class.

The following detailed discussion of FIG. 4 is sufficient to enable one of skill in the art to program a conventional system to perform the functions described above.

FIG. 4 identifies the main computational components in the network partitioning algorithm for identifying packets by comparing the summary weight of internal links in the packet exceeding the summary weight of links in the cutset (the links connecting the packet to the surrounding network).

The network, as submitted to the algorithm, is "preprocessed," at step 60, which includes determination of the degree of prior partitioning, i.e., network connectivity. If the network is found to be partially disconnected, all the connectivity components are located and all the subsequent computations are applied to those components. If the network is substantially disconnected, the user is informed to that effect via the SIMM, and further computations are typically postponed until a sufficient number of allocation examples have been accumulated to ensure a sufficient degree of network connectivity.

Edge sorting, performed in step 62, arranges connections in the decreasing order of weights.

Spanning tree extraction is performed next, at step 64, to obtain a subnetwork in the form of a tree containing all the network nodes. Since usually several spanning trees can be obtained, the heaviest one (having the largest sum of connection weights) is selected for further processing.

An algorithm for tree decomposition is then applied at 66 to obtain the required packets in the spanning tree. Operation of the algorithm is based on determination of tree components in the form of simpler structures, such as chains, and gradual growing of those chains followed by their detachment from the tree after the required packet criteria are satisfied on the product of such growth, that is, when the summary weight of the resulting structure exceeds the summary weight of its cutset.

In an alternative and equivalent computation, the packets may be identified when the average weight of the links within the packets exceeds the average weight of links connecting the packet to outer nodes. Again, the effect of this comparison is to identify the most reliable of the links.

The edge return module, step 68, resubmits for computation those connections that were initially separated from the network during construction of the spanning tree at step 64. The returned connections are either incorporated into already generated packets, or cause their merger into larger packets. In the latter case, the edge sorting step 66 is reapplied to establish a new order on the entire set of connections, and a new spanning tree is generated at 64 to include connections responsible for the merger of packets at the previous interaction cycle. The process continues until the same packets are generated repeatedly in the several subsequent cycles, indicating their reliability. The result is near-optimal partitioning of the network into the required packets, as indicated at 70.

The parallel module, provided at 72, deals with special rare classes of networks having spanning trees which are not decomposable. In such cases, highly reliable connections are found in the network and are grown in parallel until the usual packet criteria are met thereby.

Reference was made in the above to use of the invention to improve the performance of software. Such "interactive software" design according to the invention allows the software to have the capability to organize data and commands as they are selected by the user, e.g., to reconfigure a particular control panel arrangement, or to reconfigure a "tree" relating a series of user menus. According to the invention, the user's pattern of selecting the control options provided by a complex software-implemented system is monitored to, in effect, custom design his software interface. In this use of the invention, each command becomes a resource, and the system interface is updated to simulate the pattern of usage of the commands in a manner equivalent to replacing commonly-used packets of nodes and links with supernodes.

Typically, commands selected repetitively become a packet organized by the software and presented as a menu of control options. For example, in connection with a "print" command used with a word processor, one will typically select a page format, a document format, a type font and so forth, and control menus displayed in response to the "print" command typically include these control options. However, no menu suits all users equally well. Some users may also select a printer; others may want to electronically fax the document; still others may archive the document. According to the invention, in this example, the menu appearing on the screen in response to selection of the "print" control option is adapted over time to prompt the user to select those control options which he had previously selected in conjunction with the "print" command, so as to simplify and speed subsequent use of the program. In a particularly simple implementation, where the user selects a control option not forming part of the menu displayed, that option is added to that menu. Those of skill in the art in designing user interfaces for computer programs will recognize methods in which this self-adaptive user interface can be provided without detailed disclosure thereof in this application.

A further use of the invention relates to adaptive control panel design. As in the case of the adaptive software program interface just discussed, control panels (e.g., of power plants, aircraft, chemical plants and the like) typically comprise user information displays and user input devices, the latter comprising keyboards, mice, touch-screens, and the like. The user selects various control options responsive to the information displayed; commonly his choice will be for further information or further control options. According to the invention, the user's pattern of selection of control options, e.g., during evaluation of a prototype of a new design, is monitored and used to reconfigure the display, and/or the sequence of display of further control options, to better suit the user's convenience.

The claims following are intended to include these and further uses of the system and methods of the invention where not specifically excluded therefrom.

The following provides a more rigorous mathematical statement of the process of solving each of the elements in a resource allocation matrix as shown schematically in FIG. 1, according to the invention. In the exemplary embodiment discussed herein, these functions are carried out by the STM, but the invention is not to be thus limited.

A general probabilistic resource allocation problem is defined as follows: given a set of S goals having different relative priorities $G_1, G_2, \ldots G_s$, and a set of N resources $R_1, R_2, \ldots R_n$ having different probabilities $\{\eta_{ij}\}$ of satisfying the goals ($\{\eta_{ij}\}$ is the probability that resource $R_j$ will satisfy goal $G_i$), obtain the resource allocation matrix $\{\delta_{ji}\}$ that maximizes the objective function F of the form $$F = F(\delta) = \sum_{i=1}^{S} G_i \left( 1 - \prod_{i=1}^{N} \epsilon_{ji} \delta_{ji} \right) \quad (1)$$

under the constraints $$\sum_{i=1}^{S} \delta_{ji} = 1, j = 1, \ldots, N;$$

$$\delta_{ji} \in 1; 0 1; 1 \geq (\epsilon_{ji} = 1 - \eta_{ji}) \geq 0$$

Equation (1) maximizes the gain $G_i$; the constraints simply express mathematically the condition that a particular resource (each represented by its probability of success $\eta_{ji}$) can only be used once.

This optimal allocation algorithm allocates resources to goals sequentially, starting with the goal of the highest priority. At each step t, a special allocation matrix $$\|\Delta_{kl}^{(t)}\|_N \quad (2)$$

is computed providing the value of objective function increments, that is, the net gain for each allocation of a resource to a goal is computed for all possible allocations of all the resources remaining after the previous (t-1) allocation steps. At each step t, the allocation with the highest such increment is chosen, until the resource pool is exhausted.

The basic algorithm is as follows:

Step 1. Compute the components of the current matrix $$\Delta_{kl}^{(t)} = G_l^{(t-1)} \eta_{kl} - \sum_{i \neq l} \frac{G_l^{(t-1)} \eta_{ki}}{\epsilon_{ki}} g_i^{(t-1)}, \quad (3)$$

$$k \in N^{(t)}, l = 1, 2 \ldots S.$$

where:

$$G_l^{(0)} = G_l, g_l^{(0)} = \prod_{j=1}^{N} \epsilon_{ji}, i, l = 1, 2 \ldots S$$

and $N^{(t)}$=remainder of the resource set still unallocated in the previous (t-1) steps.

In Equation (3), the term $G_1^{(t-1)}$ is the gain for the particular goal being processed, i.e., the gain obtained by the allocation of one or more particular resources to a goal $G_1$. The $g_i$ term represents the potential losses with respect to the remainder of the set of goals, that is, represents goals that can not be achieved due to a prior allocation of a resource to a particular goal. The process is repeated until all goals have been met. Subsequent steps evaluate other solutions.

Step 2. Allocate the $k_t$ resource to the $1_t$ goal $$\Delta_{k_t 1_t} = 1$$

to satisfy the condition $$\Delta_{k_t 1_t} = \max \Delta_{k 1}.$$

This step selects the maximal gain for a particular possible solution.

Step 3. Increment the objective function $$F_t = F_{t-1} + \Delta_{k_t l_t}, F_0 = 0.$$

Step 4. Recompute $G^{(t)}$ and $g_i^{(t)}$ as follows:

$$G_1^{(t-1)} \text{ if } 1 \neq 1_t$$

$$G_i^{(t)} = G_1^{(t-1)} \epsilon_{k_t l} \text{ if } 1 = 1_t$$

$$g_i^{(t)} = \frac{g_i^{(t-1)}}{\epsilon_{k_t l}}$$

Step 5. If $t<N$, go to 1; the process is complete when $t=N$, that is, when all resources have been assigned.

Analysis shows that the computational complexity of this algorithm, that is, the number of elementary operations required for solution, is directly proportional to $N^2$. Formation of imploded packets according to the invention reduces the number of nodes to some $K<<N$, thus reducing the problem complexity.

More specifically, each step in the algorithm requires computation of the matrix $$\|\Delta_{kl}^{(t)}\|_{NS}$$

for all the $N^{(t)}$ remaining components. As packets are formed according to the invention, such matrices are limited to the members of a subset of packets only, entailing savings at each step in the algorithm. In other word, formation of packets replaces the original problem of allocating N resources with the problem of allocating K "macro-resource" (packets) (K<<N), each macro-resource acting against only a subset of goals.

In a more general resource allocation problem, interaction among the goals can be accounted for by presuming that satisfaction of some goal $G_m$ entails satisfaction (or priority reduction) of $G_f$. This possibility allows the priority of goals to change as goals are met. For example, in the battlefield situation, the priority of hitting particular targets may change as the battle unfolds; if a bridge connecting the enemy supply depot to their front is destroyed, it may be unnecessary to target the supply depot, and the weapons may be better used on other enemy assets.

The objective function in this case takes the form $$F(\delta) = \sum_{i=1}^{S} G_i \left\{ 1 - \prod_{j=1}^{S} \left[ 1 - \alpha_{ji} \left( 1 - \prod_{v=1}^{N} \epsilon_{vj}^{\delta_{vj}} \right) \right] \right\} \quad (4)$$

under the constraints:

$$\sum_{j=1}^{S} \delta_{vj} = 1, v = 1, \ldots, N, \delta_{vj} \in \{1, 0\},$$

$$0 \leq (\epsilon_{vj} = 1 - \eta_{vj}) \leq 1, i, j = 1,$$

$$0 \leq (\alpha_{ji} = 1 - \beta_{ji}) \leq 1, G_i \geq 0, v = 1, \ldots, N, \alpha_{jj} = 1.$$

This problem is solved in a similar fashion, although employing a different form of allocation matrix. The computational complexity of its solution is proportional to $N^3$, entailing still greater reduction of problem complexity due to packet implosion, in comparison with the previous case of non-interacting goals.

Regardless of the problem details and efficiency of the resource allocation algorithms, formation of packets followed by packet implosion according to the invention guarantees savings in the amount of computation with the accumulation of allocation experience.

Standard algorithms of path algebra are applied to determine reliable paths in the deconstructed or "imploded" network. Link reliability is equated to the relative frequency of exercising that link in the previous allocations. Correspondingly, a reliable path to the goal $G_i$ presents allocation of resources to $G_i$ most consistent with the previous allocation decisions. Resource allocation to any current goal set $G_1, G_2, \ldots G_n$, is obtained by finding sufficiently reliable paths to the set members, with the reliability of the path computed as the product of constituent link reliabilities.

The role of the SIMM 40 in the example given of the invention is to provide performance feedback to the LTM, to query the user as to the allocation requirements of the particular problem, and to control system functions based on those requirements. The principal SIMM functions are to obtain from the user the current goals and priorities and performance feedback information, that is, the degree of satisfaction responsive to the previous cycle of resource allocations, and the overall estimate of allocation success. Where performance is satisfactory, the strength of all the participating links is incremented. Otherwise, those packets with the least reliable (i.e., the least-used) connections to the satisfied goals are identified, and re-allocated to the unsatisfied goals. Connection strengths are then adjusted based on the re-allocations.

As discussed above, the invention can be implemented in a number of different ways. For example, a large-scale system may comprise a number of individual processors, each making up one of the nodes of a network implementing the functions described above; that is, each processor would be programmed to receive resource allocation information from neighboring nodes via links, to carry out the individual gain calculations corresponding to the resource represented by that node of the network, and to communicate that information to the surrounding nodes by way of the connecting links. Such a multi-processor computer could be configured conveniently according to the invention to carry out solutions of differing classes of problems of resource allocation; that is, the same machine could carry out different kinds of resource allocation problems according to the invention. In each case, the network would be provided with its memory, the network thus being "decomposed", upon being loaded with the stored information regarding successfully solved prior problems of the same class. Different groups of nodes would become supernodes depending on the class of problem to be solved at a particular time. Similarly, as also discussed above, the invention could be configured entirely in software, and run on a conventional computer; in this case, the nodes would be memory locations having the available resources stored therein. This information would be brought into a central processor for calculation of the individual gain functions and summation thereof with the gain functions calculated with respect to surrounding nodes in the network, corresponding to communication of the result over the links. Hybridized versions of the system, e.g., using a known vector processor to carry out repetitive calculations under control of a conventional computer, are also within the scope of the invention.

It should also be appreciated that replacement of commonly-used nodes by supernodes can be made by comparing the solutions reached in successive solutions of problems of a similar class of problems to one another, or by determining which nodes are commonly employed in alternative solutions to the same problem. Accordingly, the claims which follow should be read to include both alternatives, as a step in identifying the nodes to be replaced with a less-complicated group of supernodes.

It will further be appreciated that while a number of examples of use of the invention have been given, and while specific implementations of the inventions have also been described herein, the invention is not to be limited thereby, but only by the following claims.

What is claimed is:

1. A self-adaptive system for providing progressively improved solutions to successive examples of a class of generally similar problems of resource allocation, comprising:

a supervisory and interaction management module (SIMM) for receiving input data describing the goals to be met in solution of, and the resources available to solve, a particular problem;

a short-term memory (STM) for receiving said input data from said SIMM, for receiving a list of candidate resources from long-term memory, and for comparing the input data to the candidate resources to determine a near-optimal resource allocation;

a long-term memory (LTM) maintaining a list of candidate resources and associated probabilities of goal satisfaction, said LTM being effectively implemented as a reconfigurable network of nodes connected to neighboring nodes by links, each node representing a step in a pathway connecting one or more resources to one or more goals, means for computing alternate pathways between the nodes of the network in order to allocate resources to goals in deriving candidate solutions of each particular problem of said class of problems, and for evaluating the relative efficiency of each of the alternate pathways thus computed in order to determine an optimum solution for that particular problem with respect to the present configuration of the network;

means for identifying common groups of nodes connected by links employed in the optimum solutions of plural examples of problems from a given class of problems; and means for effectively decomposing said network by replacing said identified common groups of nodes connected by links with fewer nodes connected by fewer links to one another, or to the nodes previously connected to the identified common group of nodes, for subsequent solution of further problems from said given class of problems.

2. The system of claim 1, wherein said means for identifying common groups of nodes connected by links employed in the optimum solutions of plural examples of problems from a given class of problems comprises means for maintaining a record of the frequency of use of each of the links connecting nodes in the network in the optimum solutions of successive examples of problems from a given class of problems.

3. The system of claim 2, wherein said means for identifying common groups of nodes connected by links employed in the optimum solutions of plural examples of problems from a given class of problems identifies said common groups by successively assigning groups of nodes to packets, comparing the frequency of use of the links internal to each of the packets to those connecting the nodes of each packet to nodes outside each packet, and treating the nodes of the packet as an identified common group of nodes when the frequency of use of the links internal to the packet exceeds the frequency of use of the links connecting the nodes internal to the packet to nodes outside the packet.

4. The system of claim 1, further comprising means for returning the network to its original configuration prior to carrying out resource allocation according to the optimum solution thus derived.

5. The system of claim 1, wherein said fewer nodes connected by fewer links to the nodes previously connected to the identified common group of nodes employed to replace each identified common group of nodes comprises a single node connected by links with all nodes to which the identified common group of nodes was connected.

6. The system of claim 1, further comprising means for storing the network configuration after identification of a group of common nodes in solution of a particular problem, and means for subsequent decomposition of the network to implement the stored configuration responsive to indication that a problem from the same class of problems is to be solved.

7. A method for increasingly efficient solution of a series of problems from a class of problems requiring allocation of resources to a plurality of goals, comprising the steps of:

defining a reconfigurable network of nodes connected by links, each node effectively representing a step in allocating given resources to given goals;

carrying out the following steps in solution of a particular problem:

computing alternate pathways between the nodes of the network in order to allocate resources to goals in solution of each particular problem of said class of problems; and evaluating the relative efficiency of each of the alternate pathways thus computed, in order to determine an optimum solution for that particular problem with respect to the present configuration of the network; and carrying out the following steps after reaching an optimum solution for a particular problem with respect to the present configuration of the network:

comparing the sets of nodes employed by the optimum solution to similar sets of nodes employed in the optimum solutions of other problems of the same class of problems;

determining whether common groups of nodes are employed substantially similarly in the optimum solutions of plural problems from a given class of problems; and if such common groups of nodes are identified, reconfiguring the network for increased efficiency in subsequent solution of problems from the same class of problems, by replacing said identified common groups of nodes with fewer nodes connected to one another, or to the nodes connected to the replaced common groups of nodes.

8. The method of claim 7, wherein said identified common groups of nodes are replaced by single nodes connected to the nodes connected to the replaced common group of nodes.

9. The method of claim 7, wherein said step of determining whether common groups of nodes are employed substantially similarly in the optimum solutions of plural problems from a given class of problems is performed by maintaining a record of the frequency of use of each of the links connecting nodes in the network in the optimum solutions of successive examples of problems from a given class of problems.

10. The method of claim 7, wherein said step of determining whether common groups of nodes are employed substantially similarly in the optimum solutions of plural problems from a given class of problems is performed by successively assigning groups of nodes to packets, comparing the frequency of use of the links internal to each of the packets to those connecting the nodes of each packet to nodes outside each packet, and treating the nodes of the packet as an identified common group of nodes when the frequency of use of the links internal to the packet exceeds the frequency of use of the links connecting the nodes internal to the packet to nodes outside the packet.

11. The method of claim 7, comprising the further steps of storing the network configuration responsive to identification of a group of common nodes in solution of a particular problem, and decomposing the network responsive to the stored configuration responsive to indication that a problem from the same class of problems is subsequently to be solved.

12. The method of claim 7, comprising the further steps of calculating a gain component with respect to each node assigned to an alternate pathway connecting one or more resources to goals, and evaluating the relative efficiency of each pathway as a sum of said gain components of all nodes employed in said pathway.

13. The method of claim 12, wherein said step of calculating the gain component with respect to each node is performed responsive to a transaction cost assigned thereto.

14. A method of reconfiguring an adaptive user interface responsive to patterns of use, said interface comprising user information display means and a plurality of user input means, said user input means permitting the user to select from among control options provided as linked sequences of control options and displayed for user selection on display means, comprising the steps of:

modeling the linked sequences of control options as a network of nodes connected by links, wherein the nodes are control options and the links are associations between respective control options, said associations including both user-selected sequences of control options and predetermined linked sequences of control options, wherein linked sequences of control options are represented as packets of highly-connected nodes;

displaying said linked sequences of control options corresponding to said packets of highly-connected nodes as menus of control options;

monitoring user patterns of selection of control options, in order to identify commonly-selected control options; and adding said commonly-selected control options to said displayed linked sequences of control options corresponding to said packets of highly-connected nodes;

thereby reconfiguring the display of menus of control options responsive to the sequence of selection of specific control options by the user as said interface is used.

15. The method of claim 14, wherein said steps of displaying said linked sequences of control options corresponding to said packets of highly-connected nodes as menus of control options;

monitoring user patterns of selection of control options, in order to identify commonly-selected control options;

adding said commonly-selected control options to said displayed linked sequences of control options corresponding to said packets of highly-connected nodes; and thereby reconfiguring the display of menus of control options responsive to their selection by the user comprise the steps of:

providing a nominal tree structure of menus of said control options, said menus of said tree being linked such that selection of a control option from a given menu accesses a further menu;

displaying a menu of available control options on said display means at all times when user input is possible;

prompting the user to select control options from the menu displayed, while permitting the selection of other control options;

accepting user input indicating selection of a particular control option from a particular menu displayed, and providing an appropriate linked menu in response thereto;

accepting user input indicating selection of a particular control option other than from the particular menu displayed, and further recording the control option selected by the user with respect to the particular menu; and adding each control option selected by the user to the menu displayed at its time of selection if not already included therein.

16. A self-adaptive system for providing progressively improved solutions to successive examples of a class of generally similar problems of resource allocation, comprising:

means for maintaining a complete list of candidate resources and associated probabilities of goal satisfaction, said means for maintaining being effectively implemented as a reconfigurable network of nodes connected to neighboring nodes by links, each node representing a step in a pathway connecting one or more resources to one or more goals;

means for accepting input data describing the goals to be met in solution of, and the resources available to solve, a particular problem, and for supplying said input data to said means for maintaining;

means for computing alternate pathways between the nodes of the network in order to allocate resources to goals in solution of each particular problem of said class of problems, and for evaluating the relative efficiency of each of the alternate pathways thus computed in order to determine an optimum solution for that particular problem with respect to the present configuration of the network;

means for identifying common groups of nodes connected by links employed in the optimum solutions of plural examples of problems from a given class of problems; and means for effectively reconfiguring said network by replacing said identified common groups of nodes connected by links with fewer nodes connected by fewer links to one another, or to the nodes previously connected to the identified common group of nodes, for subsequent solution of further problems from said given class of problems.

17. The system of claim 16, wherein said means for accepting input data comprises means for receiving a list of candidate resources from said means for maintaining, and for comparing the input data to a limited set of the candidate resources to determine a near-optimal resource allocation, supplied to said means for computing alternate pathways between the nodes of the network as an initial solution.

18. The system of claim 16, wherein each of said nodes comprises means for evaluating the probability of success of satisfying a particular goal by allocation of resources thereto, such that said network of nodes comprises an element of said means for computing alternate pathways.

19. A method for modularizing and reducing the size of a network of computational nodes connected by links, said network being employed in solution of successive similar problems, comprising the steps of:

storing information describing the connection of nodes by links in solution of successive problems;

assigning groups of nodes and connecting links to candidate packets;

evaluating the relative frequency of use of the links of particular packets in solution of successive problems with respect to the frequency of use of the links connecting the packets to one another, and to the remainder of the network; and replacing commonly-used packets with nodes connected by links to the nodes connected to the packets thus replaced.

20. The method of claim 19, wherein the average frequency of use of the links of the candidate packets is compared to the average frequency of use of links outside said candidate packets in said evaluating step.

21. The method of claim 19, wherein the total frequency of use of the links of the candidate packets is compared to the total frequency of use of links outside said candidate packets in said evaluating step.

* * * * *